(12) United States Patent
Takezaki

(10) Patent No.: US 8,443,414 B2
(45) Date of Patent: May 14, 2013

(54) INFORMATION PROCESSING APPARATUS AND METHOD FOR CONTROLLING A TV RECEIVER

(75) Inventor: Satoshi Takezaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 735 days.

(21) Appl. No.: 12/031,679

(22) Filed: Feb. 14, 2008

(65) Prior Publication Data

US 2009/0007213 A1    Jan. 1, 2009

(30) Foreign Application Priority Data

Jun. 27, 2007    (JP) ................................ 2007-169449

(51) Int. Cl.
 *H04N 7/173*    (2011.01)
(52) U.S. Cl.
 USPC ........... 725/132; 725/152; 725/133; 725/140; 725/141; 725/147
(58) Field of Classification Search .......... 725/132–133, 725/140–141, 147, 152–153
 See application file for complete search history.

(56) References Cited

U.S. PATENT DOCUMENTS

| | | | |
|---|---|---|---|
| 6,314,479 B1 | 11/2001 | Frederick et al. | |
| 6,810,528 B1 * | 10/2004 | Chatani | 725/109 |
| 7,142,226 B2 | 11/2006 | Sakuta et al. | |
| 7,161,619 B1 | 1/2007 | Niida et al. | |
| 7,624,417 B2 * | 11/2009 | Dua | 725/114 |
| 2007/0050811 A1 * | 3/2007 | Moriwaki et al. | 725/37 |
| 2008/0168519 A1 * | 7/2008 | Rao et al. | 725/127 |
| 2009/0125968 A1 * | 5/2009 | Perlman et al. | 725/133 |

FOREIGN PATENT DOCUMENTS

| | | |
|---|---|---|
| JP | H05-006159 A | 1/1993 |
| JP | H05-292536 A | 11/1993 |
| JP | 9-55893 A | 2/1997 |
| JP | H11-161460 A | 6/1999 |
| JP | 2000-138870 A | 5/2000 |
| JP | 2001-42975 A | 2/2001 |
| JP | 2002-341843 A | 11/2002 |
| JP | 2003-110961 A | 4/2003 |
| JP | 2005-165341 A | 6/2005 |
| JP | 2006-108750 A | 4/2006 |

OTHER PUBLICATIONS

Notification of Reasons for Refusal issued Feb. 14, 2012, in corresponding Japanese Patent Application No. 2007-169449 in 8 pages.
Notification of Reasons for Refusal issued Jun. 26, 2012, in corresponding Japanese Patent Application No. 2007-169449 in 8 pages.

\* cited by examiner

*Primary Examiner* — Pankaj Kumar
*Assistant Examiner* — Charles N Hicks
(74) *Attorney, Agent, or Firm* — Knobbe, Martens, Olson & Bear, LLP

(57) ABSTRACT

According to one embodiment, there is provided an information processing apparatus connectable to a TV receiver via a digital image interface, including: a display device; a plurality of image output terminals including a digital image output terminal associated with the digital image interface; an image output selection section configured to select an image output terminal for output to the TV receiver from the plurality of image output terminals; and an image output section configured to output image data of an image being displayed on the display device and control data for control of the TV receiver to the TV receiver through the selected digital image output terminal, the image output section configured to generate the control data based on an operation state of the information processing apparatus.

14 Claims, 5 Drawing Sheets

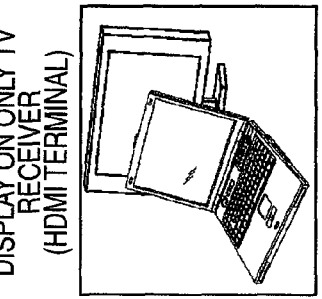
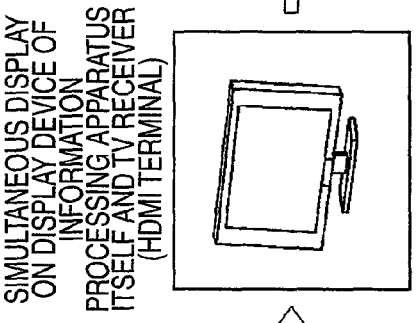
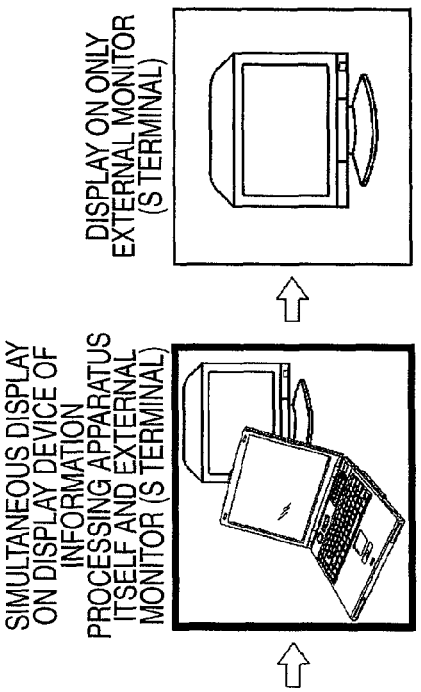
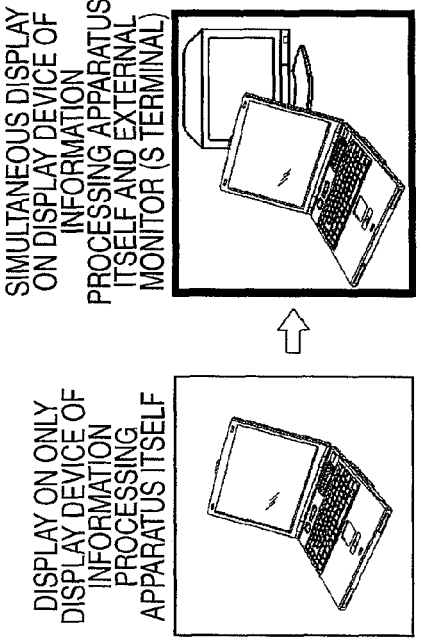

INFORMATION PROCESSING APPARATUS AND METHOD FOR CONTROLLING A TV RECEIVER

CROSS-REFERENCE TO RELATED APPLICATIONS

This application is based upon and claims the benefit of priority from Japanese Patent Application No. 2007-169449, filed on Jun. 27, 2007, the entire contents of which are incorporated herein by reference.

BACKGROUND

1. Field

One embodiment of the invention relates to an information processing apparatus and a method for controlling a TV receiver by an information processing apparatus, more particularly, relates to an information processing apparatus for displaying an image on a TV receiver connected thereto as well as to a method for controlling a TV receiver by an information processing apparatus in which the information processing apparatus and the TV receiver are connected to each other and the image quality etc. of the TV receiver are controlled.

2. Description of the Related Art

At present, many information processing apparatus such as personal computers enable viewing of an image such as a movie image on their display screen by reproducing a recording medium such as a DVD. Furthermore, equipped with external connection terminals for video and audio data, such information processing apparatus enable display of an image on an external, large display device such as one that is part of a TV receiver.

When a user views an image that is displayed on a display device, the user sometimes adjusts the image quality according to his or her tastes. For example, a TV receiver is equipped with manipulation portions such as controls for adjustment of image quality characteristics such as the brightness, contrast, hue, color density, and resolution and a user adjusts the image quality according to his or her tastes by manipulating the manipulation portions. The user can also make image quality adjustments by using a remote controller.

However, in general, image quality adjustments of a TV receiver are very complicated. The controls for image quality adjustments are in many cases distributed at plural locations. To make image adjustments with the remote controller, it is necessary to perform plural manipulations using menu pictures etc.

It is disclosed by, for example, JP-A-2000-138870 that a technique for reducing the above-mentioned complexity of image quality adjustments is made when a TV receiver is connected to an information processing apparatus. More specifically, the image quality characteristics such as the brightness, contrast, hue, color density, and resolution are adjusted in advance on the display screen of the information processing apparatus. Individual image adjustment parameters that have been set by the image quality adjustments are sent to the TV receiver via an IEEE 1394 serial communication bus and stored in a memory of the TV receiver.

However, digital TV receivers capable of receiving a high-quality image of ground-wave digital broadcast, satellite digital broadcast, or the like and displaying it on a large display device at high resolution are now spreading widely.

Digital TV receivers of this kind are much higher in multifunctionality than related-art analog TV receivers. These digital TV receivers not only receive and display an image but also realize various functions of an information apparatus having a large display device when connected to the Internet or an information processing apparatus such as a personal computer.

In terms of image quality adjustments, they have been sophisticated and advanced in multifunctionality; for example, a function that enables selection of an image quality mode that is suitable for the brightness of a room and a kind of illumination has been added.

A wide variety of external video terminals have come to be employed. For example, digital TV receivers have spread that are equipped with, in addition to the most conventional composite terminal (usually called a pin terminal), analog video signal terminals such as a separate terminal (usually called an S terminal), component terminals to which three cables are to be connected, and a D terminal and an HDMI (high definition multimedia interface) terminal for a digital video signal.

In the above circumstances, a use form is increasingly employed in which a digital TV receiver is connected to an information processing apparatus such as a personal computer and an image of the information processing apparatus is displayed on the display device (hereinafter referred to as "TV display") of the digital TV receiver rather than the display device (hereinafter referred to as "PC display") of the information processing apparatus or on both of the PC display and the TV display.

In this use form (hereinafter may be referred to as "PC-TV link form"), the main subject of manipulation of a user is the information processing apparatus and the digital TV receiver is mainly intended to merely monitor an image of the information processing apparatus. The number of manipulations to be performed on the digital TV receiver should be as small as possible.

However, at present, the functions provided in the digital TV receiver are set or adjusted only by manipulating the digital TV receiver. That is, where an image generated by the information processing apparatus is displayed on the TV display, image quality adjustments on the TV display need to be performed by using the remote controller or the like of the digital TV receiver. A manipulation of selecting the video terminal that is currently connected to the information processing apparatus from the plural video terminals of the digital TV receiver needs to be performed independently on the digital TV receiver.

As described above, although the levels of the functions and the performance of digital TV receivers themselves and information processing apparatus themselves have been increased, there is room for further improvements in operability and optimization of functions in the PC-TV link form.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 3(a) to 3(e) show an exemplary method for selecting an image output terminal of the information processing apparatus.

DETAILED DESCRIPTION

Various embodiments according to the invention will be described hereinafter with reference to the accompanying drawings. In general, according to one embodiment of the invention, there is provided an information processing apparatus connectable to a TV receiver via a digital image interface, including: a display device; a plurality of image output terminals including a digital image output terminal associated with the digital image interface; an image output selection section configured to select an image output terminal for output to the TV receiver from the plurality of image output terminals; and an image output section configured to output image data of an image being displayed on the display device and control data for control of the TV receiver to the TV receiver through the selected digital image output terminal, the image output section configured to generate the control data based on an operation state of the information processing apparatus.

Figure 1:
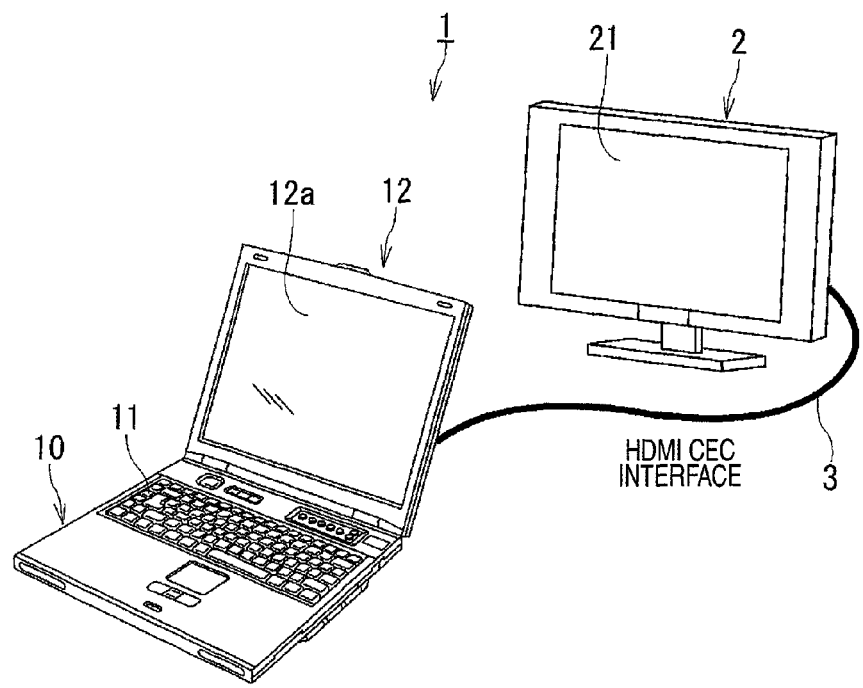
FIG. 1 shows an exemplary use form in which an information processing apparatus according to an embodiment of the present invention and a TV receiver that is controlled by the information processing apparatus are linked with each other.

(1) Configurations and Basic Operations of Information Processing Apparatus and TV Receiver According to an embodiment of the invention, FIG. 1 illustrates an information processing apparatus 1 and a TV receiver 2 connected to the information processing apparatus 1. The information processing apparatus 1, which is a personal computer, for example, is equipped with a main body 10 and a display unit 12 in an openable/closable manner. In the main body 10, a manipulation unit 11 composed of a keyboard, a pointing device, etc. is provided so as to occupy a top portion of a thin, box-shaped case. The display unit 12 has a display device 12a which is a liquid crystal panel, for example.

The TV receiver 2, which is, for example, a digital-compatible flat TV receiver, has a large display device 21.

The information processing apparatus 1 and the TV receiver 2 are connected to each other by, for example, a cable unit 3 associated with the HDMI CEC interface (digital image interface).

The HDMI CEC interface means an interface that complies with a combination of the HDMI (High Definition Multimedia Interface) standard and its sub-standard CEC (Consumer Electronics Control). The HDMI standard is provided for transmission of high-quality digital image data and digital audio data. On the other hand, the CEC standard prescribes kinds of control data to be exchanged between apparatus that are connected to each other according to the HDMI standard and related protocols. The HDMI CEC interface enables not only transmission of high-quality digital image data and digital audio data but also control of one apparatus from the other apparatus.

Inter-apparatus control according to the HDMI CEC interface is performed by using control data (or control commands) that are based on the CEC standard. Not only control data that are already prescribed but also freely definable extended control data (additional control data) can be used.

The digital image interface that is used by the information processing apparatus 1 according to the embodiment and enables transmission of image data and audio data is not necessarily limited to the above-mentioned HDMI CEC interface. However, the use of extended control data (or extended control commands) based on the above-mentioned CEC standard at least allows the information processing apparatus 1 to perform various controls on the TV receiver 2. The following description will be made with an assumption that the TV receiver 2 is controlled by using the HDMI CEC interface.

Figure 2:
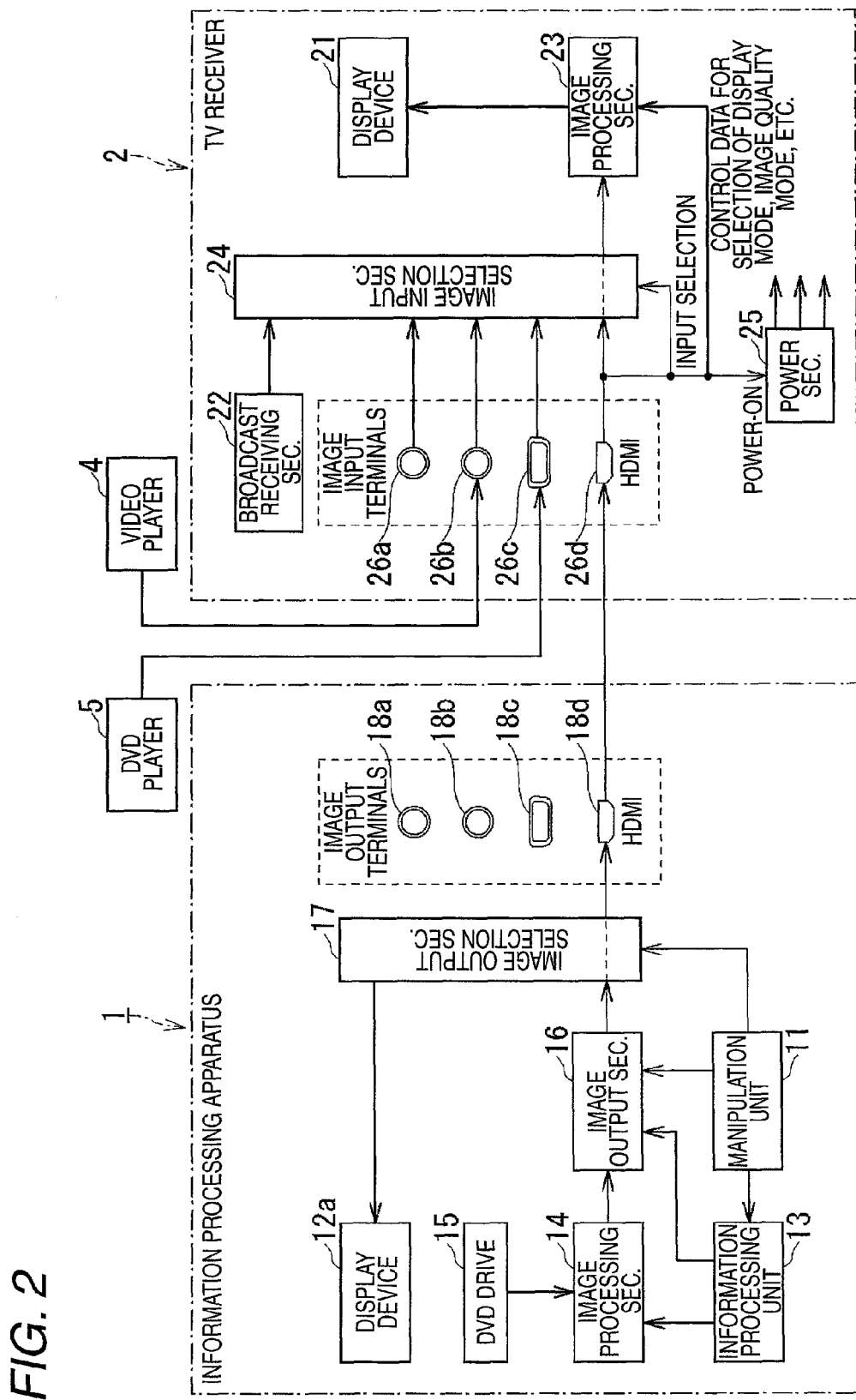
FIG. 2 shows exemplary configurations of the information processing apparatus according to the embodiment of the invention and the TV receiver that is controlled by the information processing apparatus linked with it.

FIG. 2 is a block diagram showing detailed configurations of the information processing apparatus 1 and the TV receiver 2 which is connected to the information processing apparatus 1.

First, the configuration and basic operation of the information processing apparatus 1 will be described.

The information processing apparatus 1, which is a notebook personal computer (see FIG. 1), for example, is equipped with the manipulation unit 11, the display device 12a, an information processing section 13, an image processing section 14, a DVD drive 15, an image output section 16, an image output selection section 17, and plural image output terminals 18a, 18b, 18c, 18d, etc.

The manipulation section 11 is equipped with an information input device such as a keyboard and a pointing device such as a touch panel or a mouse and serves for various manipulations on and information input to the information processing apparatus 1.

The display device 12a is a display device such as a liquid crystal panel and serves for display of various information processing images such as a document, a table, a figure, and a photograph, a moving image that is reproduced by the DVD drive 15, and other images.

The information processing section 13 performs various kinds of information processing as the CPU (not shown) or the like runs the OS and various kinds of application software.

The image processing section 14 performs image processing for generating any of various kinds of information processing images on the basis of data that is output from the information processing section 13 and displaying it on the display device 12a. The image processing section 14 also performs various kinds of image processing on a moving image, for example, that is output from the DVD drive 15.

The DVD drive 15 is a device for performing reproduction or recording and reproduction on an optical disk such as a CD or a DVD.

The image output section 16 performs conversion processing for outputting image data that has been image-processed by the image processing section 14 to the display device 12a or to the outside. For example, the image output section 16 performs resolution conversion processing for conversion into a resolution corresponding to the display device 12a or each image output terminal, analog conversion processing for output through the analog image output terminal, and other conversion processing.

The image output section 16 also performs processing of adding information to control data of the HDMI CEC interface (digital image interface), which is one of the features of the information processing apparatus 1 according to the embodiment.

The image output selection section 17 selects an output destination of image data. Whereas usually the display device 12a of the information processing apparatus 1 itself is selected as an output destination of image data, image data can be output to the outside of the information processing apparatus 1 by manipulating the manipulation unit 11. In the latter case, image data can be output to the outside while the same image data is output to the display device 12*a*. Alternatively, image data can be output only to the outside (i.e., the image data is not output to the display device 12*a*).

As described above, a wide variety of forms of image output terminals for outputting image data to the outside have come to be employed recently. For example, as shown in FIG. 2, many information processing apparatus like the information processing apparatus 1 are equipped with plural image output terminals such as a composite terminal (18*a*), an S terminal (18*b*), and a D terminal (18*c*) for output of analog image data and an HDMI terminal (18*d*) for output of digital image data. The image output selection section 17 also selects from these image output terminals.

FIG. 3 shows an exemplary method for selecting an output destination of image data. For example, if the Fn key and the F5 key of the keyboard are depressed simultaneously, plural icons shown in FIGS. 3(*a*)-3(*e*) are displayed on the display device 12*a* and a current image data output state is highlighted. In the example of FIG. 3, the display device 12*a* of the information processing apparatus 1 itself, an external CRT monitor, and the external TV receiver 2 are three available output destinations of image data and selection can be made from them individually or in combination.

FIG. 3(*a*) shows a case that only the display device 12*a* is an output destination of image data. FIG. 3(*b*) shows a case that both of the display device 12*a* and the CRT monitor are output destinations. FIG. 3(*c*) shows a case that only the CRT monitor is an output destination. FIG. 3(*d*) shows a case that both of the display device 12*a* and the TV receiver 2 are output destinations. FIG. 3(*e*) shows a case that only the TV receiver 2 is an output destination. If a user depresses the F5 key successively while continuing to depress the Fn key, the highlighted icon is moved sequentially. A desired output destination can thus be selected.

If the output destinations of image data and the image output terminals are correlated with each other in advance, an image output terminal can be selected. For example, the D terminal 18*c* (analog image output terminal) is correlated with the CRT monitor and the HDMI terminal 18*d* (digital image output terminal) is correlated with the TV receiver 2. With this corresponding relationship, if a user selects the icon of FIG. 3(*d*) or 3(*e*), the HDMI terminal 18*d* is selected from the plural image output terminals.

Next, the configuration and basic operation of the TV receiver 2 will be described.

The TV receiver 2 is equipped with a display device 21, a broadcast receiving section 22, an image processing section 23, an image input selection section 24, a power section 25, and plural image input terminals 26*a*, 26*b*, 26*c*, 26*d*, etc.

The TV receiver 2, which is, for example, a digital TV receiver capable of receiving a ground-wave digital broadcast and a satellite digital broadcast, performs, with the image processing section 23, image processing on a broadcast image received by the broadcast receiving section 22 and then displays a resulting image on the display device 21 which is a large liquid crystal display device.

The TV receiver 2 is equipped with, as plural image input terminals, not only the composite terminal 26*a*, the S terminal 26*b*, the D terminal 26*c*, etc. for input of analog image data but also the HDMI terminal 26*d* etc. for input of digital image data. AV apparatus and the information processing apparatus 1 are connected to these image input terminals. For example, as shown in FIG. 2, a video player 4 is connected to the S terminal 26*b*, a DVD player 5 is connected to the D terminal 26*c*, and the information processing apparatus 1 is connected to the HDMI terminal 26*d*. One of these image input terminals is selected by the image input selection section 24 and an image that is input through the selected image input terminal is displayed on the display device 21.

(2) Method for Controlling TV Receiver by Information Processing Apparatus

A method for controlling the TV receiver 2 by the information processing apparatus 1 via the digital image interface (more specifically, the HDMI CEC interface) in the combination of the above-configured information processing apparatus 1 and TV receiver 2 will be described below.

Figure 4:
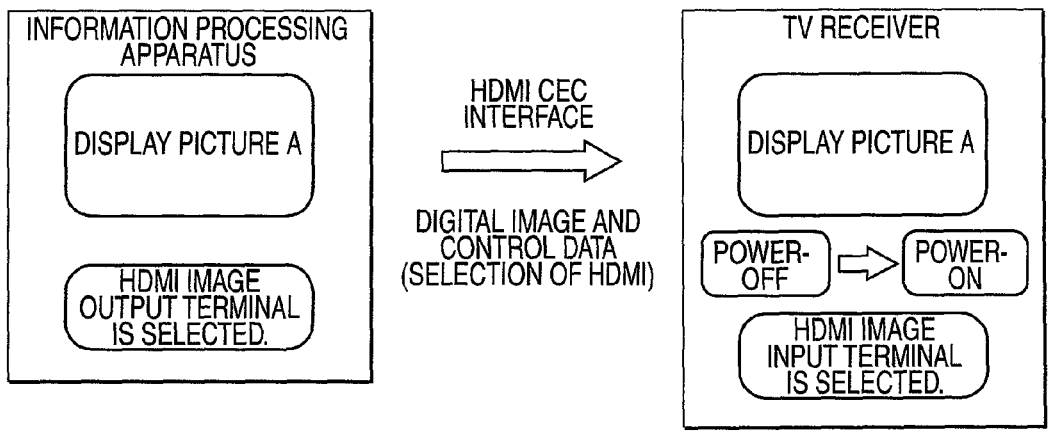
FIG. 4 illustrates an example of TV receiver control method according to a first embodiment of the invention.

FIG. 4 shows a TV receiver control method according to a first example. As described above, the HDMI CEC interface can transmit digital image data and control data. For example, if the TV receiver 2 is selected as an output destination of image data by selecting one of the icons of FIGS. 3(*d*) and 3(*e*), the HDMI (output) terminal 18*d* is selected automatically as an image output terminal and digital image data and control data are output to the TV receiver 2 through the HDMI (output) terminal 18*d*.

On the other hand, the TV receiver 2 is configured so as to always monitor a signal that is input through the HDMI (input) terminal 26*d*. If the HDMI (output) terminal 18*d* is not selected on the information processing apparatus 1 side, nothing is input through the HDMI (input) terminal 26*d*. On the other hand, as soon as the HDMI (output) terminal 18*d* is selected, digital image data and control data start to be input through the HDMI (input) terminal 26*d*. In the TV receiver 2, this signal is detected and the image input selection section 24 is instructed to select the HDMI (input) terminal 26*d*. As a result, the image data that is input through the HDMI (input) terminal 26*d* is automatically displayed on the display device 21 of the TV receiver 2.

The TV receiver 2 may be configured in such a manner that if it is not powered, a start of input of image data and control data through the HDMI (input) terminal 26*d* is detected and the TV receiver 2 is powered on by using a detection signal as a trigger.

Instead of detecting whether or not a signal is being input through the HDMI (input) terminal 26*d*, information indicating selection of the HDMI (output) terminal 18*d* may be added as extended control data of the HDMI CEC interface. In this case, the TV receiver 2 monitors the extended control data that is output from the information processing apparatus 1. If the extended control data indicates that the HDMI (output) terminal 18*d* is selected, the image input selection section 24 is instructed to select the HDMI (input) terminal 26*d* or the power section 25 is instructed to power on the TV receiver 2.

According to the TV receiver control method of the first example, an image of the information processing apparatus 1 can be displayed on the TV receiver 2 merely by making a manipulation of selecting the TV receiver 2 as an output destination of image data on the information processing apparatus 1 side in a state that the information processing apparatus 1 and the TV receiver are connected to each other via the HDMI CEC interface.

Conventionally, if the TV receiver 2 is not powered, it is necessary for a user to power on the TV receiver 2 by making a separate manipulation on the remote controller of the TV receiver 2. In contrast, this manipulation is not necessary in this example. Furthermore, conventionally, even if the TV receiver 2 is in an on state, it is necessary for a user to switch the image input terminal to the HDMI (input) terminal 26*d* by making a separate manipulation on the remote controller as long as the user is viewing a broadcast image or an image of another AV apparatus. This cumbersome manipulation is not necessary either in this example.

As described above, according to the TV receiver control method of the first example, no manipulations need to performed on the TV receiver 2 and an image of the information processing apparatus 1 can be displayed on the display device 21 of the TV receiver 2 easily and quickly.

There may occur a case that first an image of the information processing apparatus 1 is displayed on the TV receiver 2, then a broadcast program is viewed temporarily by using the remote controller, and an image of the information processing apparatus 1 is displayed again on the TV receiver 2. This is a use form of what is called switched viewing of two kinds of images (i.e., a user watches an image displayed on a TV receiver (TV receiver 2) while manipulating a personal computer (information processing apparatus 1)). Also in this use form, switching from viewing of a broadcast program to viewing of a personal computer image can be made by making a manipulation of selecting the HDMI terminal 18*d* (e.g., depression of the Fn key and the F5 key; mentioned above) on the information processing apparatus 1. Control data is generated in response to a manipulation of selecting the HDMI (output) terminal 18*d* and is output to the TV receiver 2. In the TV receiver 2, the image data input source is switched automatically from the broadcast receiving section 22 to the HDMI (input) terminal 26*d*.

Figure 5:
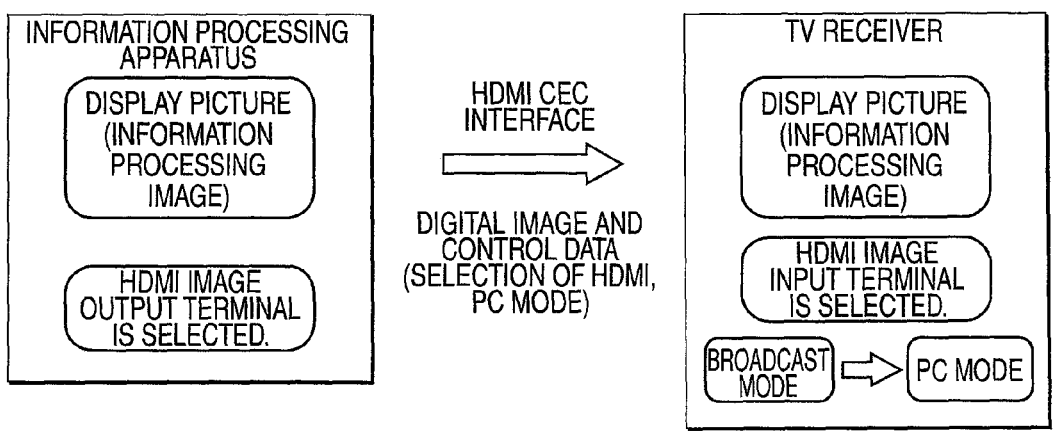
FIG. 5 illustrates an example of TV receiver control method according to a second embodiment of the invention.

FIG. 5 illustrates a TV receiver control method according to a second example. Among recent TV receivers are ones that are provided with a display mode in which optimization is made for display of an information processing image which is mainly a graphics image generated by a computer or the like and a display mode in which optimization is made for display of a moving image of a movie, a TV broadcast, or the like. For the sake of convenience, the former display mode is called "PC mode" and the latter display mode is called "broadcast mode."

It is generally pointed out that problems as exemplified below (unnaturalness or improperness of a displayed image) occur when an information processing image generated by a computer or the like is displayed on the display device of a conventional TV receiver that is optimized for display of a broadcast image (these problems do not occur when it is displayed on the display device of an information processing apparatus): (a) the color is too dense (due to a difference in the gamma value); (b) fine characters and window frames are too crisp (due to image quality settings for a moving image such as sharpness); (c) top, bottom, right, and left end portions of the image are not displayed (due to overscanning of a TV broadcast image); and (d) black level elevation or white level lowering (due to a difference in the luminance effective range).

To solve such unnaturalness and improperness, TV receivers in which the PC mode in which optimization is made for display of an information processing image and the broadcast mode in which optimization is made for display of a moving image of a movie, a TV broadcast, or the like are provided and which allows a user to switch between the two display modes are being put on the market. With a TV receiver of such a type, switching is made between the PC mode and the broadcast mode by making manipulations of selection, decision, etc. using the remote controller of the TV receiver while looking at menu pictures.

However, such switching manipulations are very complicated to a user who frequently switches between a display picture of a personal computer and a broadcast picture. The TV receiver control method according to the second example can eliminate such complicated manipulations.

Specifically, as shown in FIG. 5, control data of the HDMI CEC interface is caused to contain information indicating a display picture state of the information processing apparatus 1. For example, while the information processing apparatus 1 is not running application software for moving image reproduction, control data is caused to contain information to that effect ("PC mode") with a judgment that an information processing image is being displayed.

The TV receiver 2 detects the control data and makes switching from the broadcast mode to the PC mode if the current display mode is the broadcast mode.

In the TV receiver control method according to the second example, if a user is causing the information processing apparatus 1 to display an information processing image (an ordinary personal computer desk-top image rather than a moving image generated by reproducing a DVD or the like), the display mode of the TV receiver 2 is automatically set to the PC mode in which optimization is made for an information processing image. Therefore, complicated manipulations are avoided and an image whose quality is such as not to cause a user to feel improper can be displayed on the TV receiver 2.

Figure 6:
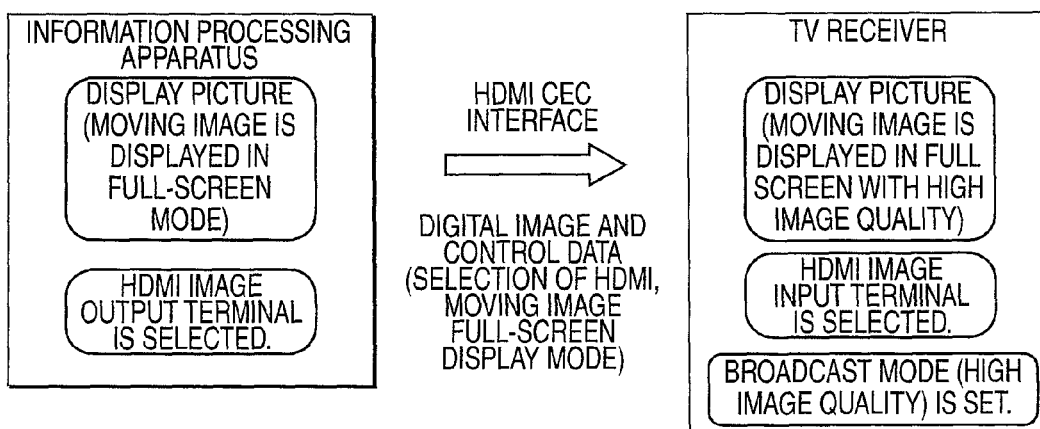
FIG. 6 illustrates an example of TV receiver control method according to a third embodiment of the invention.
Figure 7:
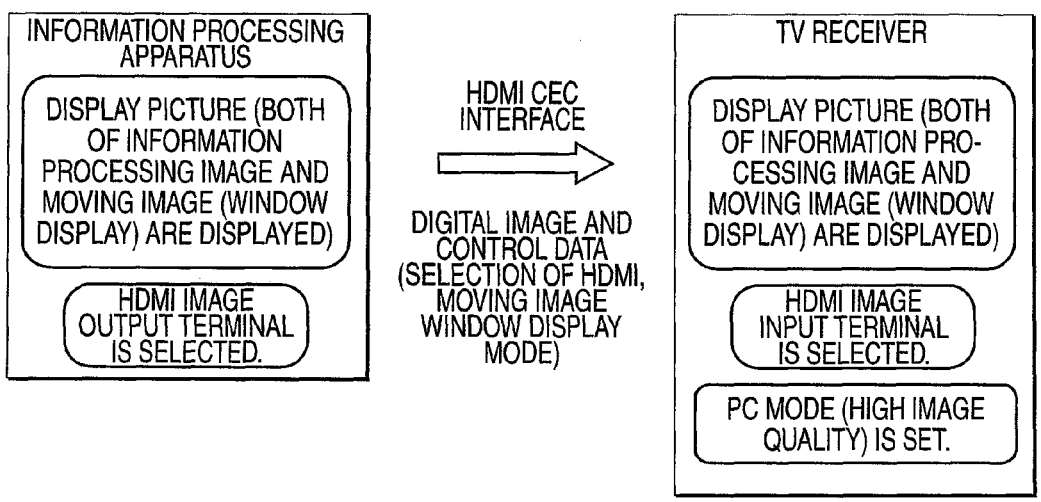
FIG. 7 illustrates an example of TV receiver control method according to a fourth embodiment of the invention.
Figure 8:
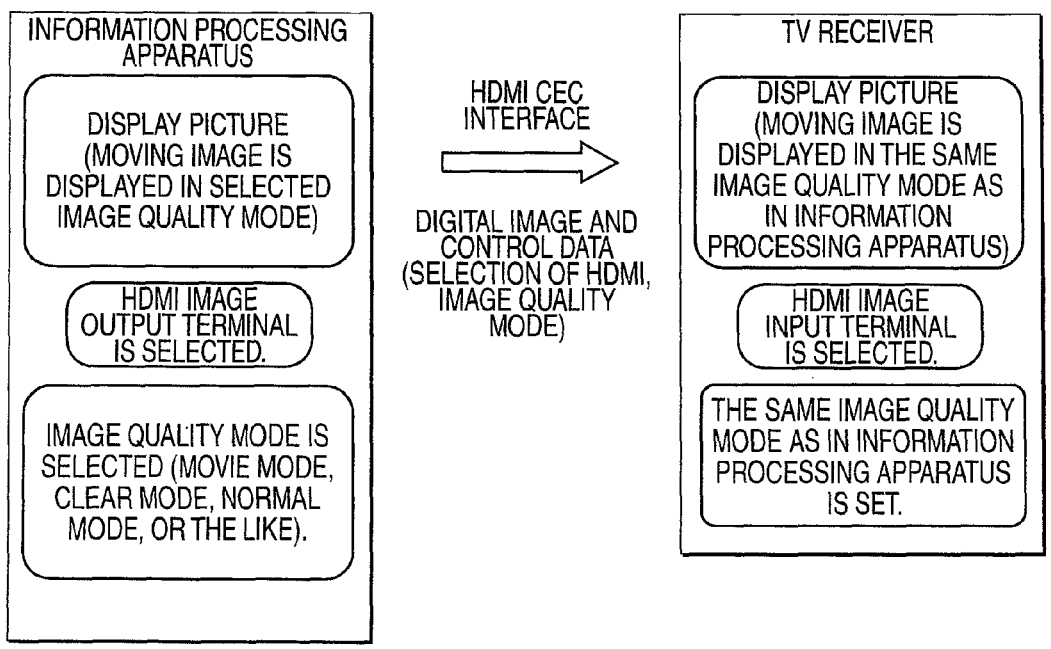
FIG. 8 illustrates an example of TV receiver control method according to a fifth embodiment of the invention.

On the other hand, FIGS. 6-8 show examples of TV receiver control methods which are employed in the case where a moving image rather than an information processing image as mentioned above is being displayed on the display device 12*a* of the information processing apparatus 1. For example, a moving image is displayed by reproducing a movie or the like from a DVD by the DVD drive 15 and displaying it using application software for moving image display.

FIG. 6 shows a TV receiver control method according to a third example in which a moving image is displayed in a full-screen display mode. In general, when a moving image is reproduced in the full-screen display mode, a user expects a high-quality image that is optimized for moving image reproduction. In view of this, control data of the HDMI CEC interface is caused to contain information to the effect that the image is being reproduced in the full-screen display mode. Receiving this control data, the TV receiver 2 automatically sets the display mode to the broadcast mode. As a result, the user can enjoy a high-quality image that is optimized for a moving image using the large screen of the TV receiver 2 without making any manipulations on the TV receiver 2.

On the other hand, FIG. 7 shows a TV receiver control method according to a fourth example in which a moving image is displayed in a window display mode. The window display mode is a combined display mode in which a moving image is displayed in a window and an information processing image is displayed in the other area. Where the display mode of the information processing apparatus 1 is set to the window display mode by a user, it is considered that the user attaches importance to the information processing image while sacrificing the quality of the moving image to some extent. In view of this, if control data of the HDMI CEC interface contains information to the effect that images are being displayed in the window display mode, the TV receiver 2 automatically sets the display mode to the PC mode.

FIG. 8 shows a TV receiver control method according to a fifth example in which each of the information processing apparatus 1 and the TV receiver 2 has plural image quality modes.

The image quality mode means a mode in which a combination of image quality parameter values is provided that is optimized for an environment or the like rather than image quality parameters such as the luminance, contrast, and gamma value are adjusted individually. For example, a normal mode is an image quality mode in which viewing under fluorescent lamps is assumed, a clear mode is an image quality mode in which an open, daytime living room environment is assumed, and a movie mode is an image quality mode in which a living room environment with incandescent lamps is assumed.

In the example of FIG. 8, the TV receiver 2 is controlled so as to select an image quality mode corresponding to an image quality mode that is selected in the information processing apparatus 1. For example, if the clear mode is selected in the information processing apparatus 1, image quality mode information indicating the clear mode is sent to the TV receiver 2 as part of control data of the HDMI CEC interface. Receiving this control data, the TV receiver 2 automatically sets its display mode to the clear mode. As a result, an image whose image quality is the same as obtained on the screen of the information processing apparatus 1 can be displayed on the large screen of the TV receiver 2 without making any manipulations on the TV receiver 2.

As described above, according to the information processing apparatus 1 and the method for controlling a TV receiver by an information processing apparatus according to the embodiment can reduce the load of manipulation on the TV receiver 2 and display an image of good image quality on the TV receiver 2 in cooperation with the information processing 1 in a use form in which the information processing apparatus 1 and the TV receiver 2 are linked with each other and an image of the information processing apparatus 1 is displayed on the TV receiver 2.

According to the above-mentioned embodiment, the information processing apparatus and a method for controlling a TV receiver by an information processing apparatus make it possible to reduce the load of manipulation on the TV receiver and to display an image of good image quality on the TV receiver in cooperation with the information processing in a use form in which the information processing apparatus and the TV receiver are linked with each other and an image of the information processing apparatus is displayed on the TV receiver.

The invention is not limited to the above embodiment itself but can be implemented in a practice stage in such a manner that the components are modified without departing from the spirit and scope of the invention. Various modifications can be made by properly combining plural components disclosed in the above embodiment. For example, several components can be deleted from all the components of the embodiment. Furthermore, components of different embodiments (examples) may be combined as appropriate. While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured to connect to a TV receiver via a digital video interface, the apparatus comprising:
    a display device;
    a plurality of video output terminals comprising a digital video output terminal associated with the digital video interface;
    a video output selection section configured to select a video output terminal for output to the TV receiver from the plurality of video output terminals; and
    a video output section configured to output video data of a video being displayed on the display device and control data for control of the TV receiver to the TV receiver through the selected digital video output terminal, the video output section configured to generate the control data based on an operation state of the information processing apparatus;
    wherein the TV receiver comprises a plurality of video input terminals; and
    wherein the video output section is configured to output to the TV receiver control data for selecting a video input terminal associated with the digital video interface from the plurality of video input terminals when the digital video output terminal is selected by the video output selection section.

2. The information processing apparatus of claim 1, wherein the video output section is configured to output to the TV receiver control data for powering on the TV receiver if the TV receiver is not powered when the digital video output terminal is selected by the video output selection section.

3. The information processing apparatus of claim 1,
    wherein, the TV receiver is configured to have a broadcast mode for realizing video quality and a display area that are suitable for a broadcast video and a PC mode for realizing video quality and a display area that are suitable for a video of the information processing apparatus; and
    wherein the video output section is configured to output to the TV receiver control data for switching from the broadcast mode to the PC mode when the digital video output terminal is selected by the video output selection section in a state that a video of the information processing apparatus is being displayed on the display device.

4. The information processing apparatus of claim 1,
    wherein the TV receiver is configured to have a broadcast mode for realizing video quality and a display area that are suitable for a broadcast video and a PC mode for realizing video quality and a display area that are suitable for a video of the information processing apparatus; and
    wherein the video output section is configured to output to the TV receiver control data for setting the broadcast mode if a moving picture is being displayed in a full screen of the display device and control data for setting the PC mode if a moving picture is being displayed in a window of the display device when the digital video output terminal is selected by the video output selection section.

5. The information processing apparatus of claim 1,
    wherein each of the information processing apparatus and the TV receiver has a plurality of video quality modes for moving picture display; and
    wherein the video output section is configured to output to the TV receiver control data for selecting a video quality mode corresponding to a video being displayed on the display device when the digital video output terminal is selected by the video output selection section.

6. A method for controlling a TV receiver by an information processing apparatus comprising a display device, comprising:
    displaying a video on the display device;
    selecting a video output terminal to the TV receiver from a plurality of video output terminals comprising a digital video output terminal associated with a digital video interface capable of transmitting video data and control data;

generating the control data based on an operation state of the information processing apparatus;

outputting video data of a video being displayed on the display device and control data for control of the TV receiver to the TV receiver through the digital video output terminal; and outputting to the TV receiver control data for selecting a video input terminal associated with the digital video interface from a plurality of video input terminal included in the TV receiver when the digital video output terminal is selected.

7. The method of claim 6, comprising:

outputting to the TV receiver control data for powering on the TV receiver if the TV receiver is not powered when the digital video output terminal is selected.

8. The method of claim 6, comprising:

outputting to the TV receiver control data for switching from a broadcast mode of the TV receiver for realizing video quality and a display area that are suitable for a broadcast video to a PC mode of the TV receiver for realizing video quality and a display area that are suitable for a video of the information processing apparatus when the digital video output terminal is selected in a state that the video of the information processing apparatus is displayed on the display device.

9. The method of claim 6, comprising:

outputting to the TV receiver control data for setting a broadcast mode of the TV receiver for realizing video quality and a display area that are suitable for a broadcast video when the digital video output terminal is selected while a moving picture is displayed in a full screen of the display device; and outputting, to the TV receiver, control data for setting a PC mode for realizing video quality and a display area that are suitable for a video of the information processing apparatus when the digital video output terminal is selected while a moving picture is being displayed in a window of the display device.

10. The method of claim 6, comprising:

outputting to the TV receiver control data for selecting a video quality mode corresponding to a video displayed on the display device when the digital video output terminal is selected while the TV receiver and the information processing apparatus comprise a plurality of video quality modes including the video quality mode, respectively.

11. The information processing apparatus of claim 1, wherein the TV receiver is configured to have a PC mode that is optimized for display of graphic images; and wherein the video output section is configured to output to the TV receiver control data for setting the PC mode if graphic images are being displayed by the display device.

12. The information processing apparatus of claim 1, wherein the information processing apparatus further comprises a computer keyboard.

13. The method of claim 6, comprising:

outputting to the TV receiver control data for setting a PC mode that is optimized for display of graphic images if graphic images are being displayed by the display device of the information processing apparatus.

14. The method of claim 6, wherein the information processing apparatus further comprises a computer keyboard.

* * * * *